April 13, 1954     L. J. ANDY     2,675,047
ANTISKID VEHICLE TIRE

Filed Dec. 21, 1948

Inventor
Louis J. Andy

By William J. Ruano
Attorney

Patented Apr. 13, 1954

2,675,047

UNITED STATES PATENT OFFICE 2,675,047

ANTISKID VEHICLE TIRE

Louis J. Andy, Washington, Pa., assignor to Andy Bros. Tire Shop, Washington, Pa., a partnership Application December 21, 1948, Serial No. 66,529

1 Claim. (Cl. 152—211)

This invention relates to vehicle tires and, more particularly, to anti-skid rubber tires.

Heretofore, it has been proposed to incorporate certain course particles into the rubber used in vehicle tires to improve the traction or anti-skid qualities. One of the outstanding disadvantages of incorporation of such particles in a rubber tire is that the tire wears at a higher than normal rate, hence its life is appreciably shorter than that of the ordinary rubber tire.

An object of the present invention, therefore, is to overcome the above-mentioned disadvantage by combining in a vehicle tire both anti-skid qualities and long life which is substantially that of the ordinary synthetic or natural rubber tire.

A more specific object of this invention is to provide an anti-skid tire having layers of synthetic or natural rubber and anti-skid rubber arranged in a manner so that as the anti-skid rubber wears in the course of winter driving, an inner layer of synthetic or natural rubber having grooves therein will be exposed to take the wear of spring, summer and fall driving, thereby giving long life to the tire.

Other objects and advantages of the present invention will become apparent from a study of the following specification taken with the accompanying drawing wherein.

Figure 1:
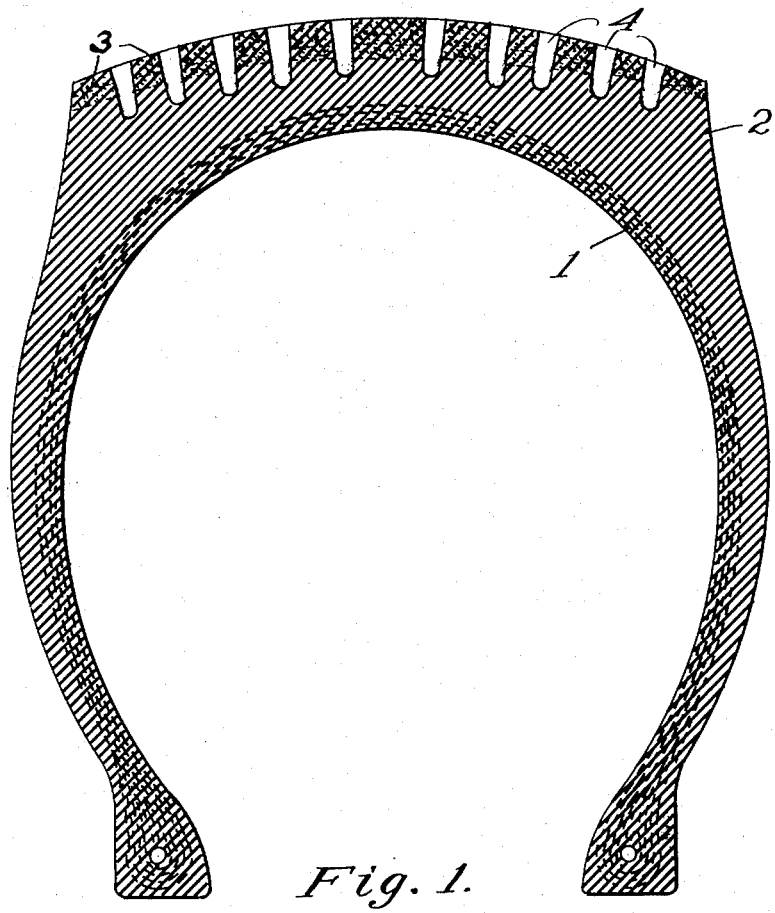
Fig. 1 is a cross-sectional view showing a vehicle tire embodying the principles of the present invention.

Referring more particularly to Fig. 1, numeral 1 denotes a tire carcass embodying a plurality of layers or plies of fabric and having a covering or layer 2 of ordinary rubber, such as synthetic or natural rubber, or rubber composition, such as commonly used in ordinary tires.

In accordance with the present invention there is provided a tread layer 3 of a rubber composition containing small particles of hard material therein for increasing the traction qualities or anti-skid characteristics of the tire. These small particles are preferably ligneous or fibrous, therefore cellular in character, and may comprise wood chunks, hard or soft, or nut shells of various kinds, embedded in and uniformly dispersed throughout a rubber matrix. These chunks are somewhat in the form of cubes or elongated blocks of irregular shape, therefore presenting many sharp corners and edges. The cellular character allows the rubber to penetrate through the cells and firmly anchor the particles within the rubber matrix. These particles are preferably of such size so that all or most of them will pass through a No. 6 mesh screen and most will be retained by a No. 40 mesh screen. While it is possible to employ a small percentage of larger than No. 6 mesh, it is not desirable to have too great a percentage of this large size because the particles are easily broken out of the tire and reduce the wearing qualities. For some purposes, where a lesser amount of traction is adequate, the particles may be made relatively large or of material soluble in water, such as rock salt, so that the particles will either fall out or dissolve with wear, leaving many small pockets, that is, a sponge-like rubber surface. However, for most purposes where substantial traction is desired, I prefer to use irregularly shaped chunks that will remain embedded in the rubber as the tire wears. The particles may, if desired, be treated with a chemical that will increase the adhesion between the wood and the rubber, such as pine tar.

While a lower limit of size of No. 40 mesh has been indicated, it is preferred to have most of the particles, or at least a large portion thereof, of a size that will be retained even by a No. 16 mesh screen inasmuch as the smaller the particles, the greater the wearing qualities. This is because the very small particles act much the same way as wood flour, thereby impairing the strength of the rubber and adding nothing to the traction resisting qualities.

An optimum mixture for securing sufficient anti-skid qualities and at the same time not unreasonably reducing the life of the tire is one which comprises approximately 10% to approximately 50% by weight of any of the aforementioned particles, the remainder being rubber, either synthetic or natural, or a rubber composition. In instances where anti-skid characteristics are paramount, a percentage even exceeding 50% may be used.

The particles may be made of other fibrous or ligneous material or, in fact, of other solid material, such as, for example, grain chunks or flecks, sand or gravel, rock salt, rock wool or wool of all kinds, cork woods of all kinds, oat shells or other grain shells or husks, metals of various kinds, hard clay, or stones, corn cobs, sugar grains, coffee grains, corn meals, etc. These materials, however, in general, do not provide the anti-skid qualities provided by the aforementioned wood chunks and nut shells or similar fibrous ligneous particles of hard material of the size specified. These particles also may comprise approximately 10% to 50% by weight of the rubber composition. The term "rubber" as used in the specification and claims is used in a generic sense and refers to either natural or synthetic rubber or compounds thereof as commonly used in tires. A preferable percentage of such particles for optimum traction and long life is between 20% and 30% by weight of the rubber composition.

A desirable thickness of the outer layer 3, that is, the tread layer, is $\frac{3}{32}$ inch to $\frac{14}{32}$ inch, or thicker. Ideally, the thickness of the outer layer 3 should be selected so as to last through the aforesaid winter months, and will vary in different parts of the country.

An important feature of the present invention resides in the manner of application of the tread layer 3 and the grooving of both the anti-skid layer 3 and the base layer 2. More specifically, the anti-skid layer 3 is applied in the form of a strip superimposed on a strip of rubber which, in turn, is wrapped about the periphery of the tire. Both the strips and outer tire surface are heated in the mold so that the rubber strip will become fused onto the outer tire surface to form the cap portion of base layer 2. The mold is of such configuration as to impress grooves, such as 4, through a portion of the thickness of base layer 2 as the latter is pressed outwardly against the outer layer 3 by inflating a tube within the tire. Layer 3 is fused or vulcanized with respect to the base layer 2. The purpose of providing grooves through the base layer is so that when the anti-skid layer 3 wears away as the result of winter driving, the base layer 2 will be exposed with a surface bearing a tread instead of being smooth, thereby providing better traction on wet roads, etc. Of course, it would be possible to extend only some or all of grooves 4 through only the thickness of the anti-skid layer. However, this would not provide the aforesaid beneficial results of complete grooving of the base layer 2 upon completion of winter driving. Any desirable tread design may be used so long as some or most of the grooves extend through the top portion of the base layer.

Figure 2:
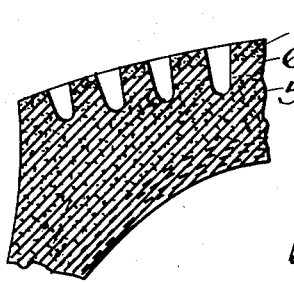
Fig. 2 is a fragmentary cross-sectional view of a modification of the tire shown in Fig. 1.

Fig. 2 shows a modification of the invention wherein a base layer 5 is made of any of the aforesaid anti-skid compositions, that is, particles of anti-skid material mixed with rubber or rubber compound, and a layer 6 of regular rubber upon which there is provided an outermost layer 7 of anti-skid composition. By sandwiching a rubber layer 6 between the anti-skid layers 5 and 7, the tire is ideally suited for purchase or use at the beginning of a winter season so that as layer 7 wears away, layer 6 will be exposed. Layer 6 should be of a thickness to carry the tire up to the next winter season, at which time base layer 5 becomes exposed. The grooves may extend through all of the layers, as shown, or, if desired, may penetrate only through layer 7 and a portion of the depth of layer 6, or both depths may be used.

Figure 3:
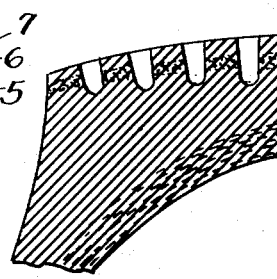
Fig. 3 is a fragmentary cross-sectional view of a second modification of the tire shown in Fig. 1.

Fig. 3 shows another modification embodying a base layer 8 of rubber which has a layer 9 of anti-skid composition and an outer layer 10 also of rubber. This design of tire is particularly suitable for use beginning in the spring season. Layer 10 is preferably of a thickness so that it will wear completely upon approach of winter, thereby exposing the anti-skid layer 9 which in turn is of a thickness so as to completely wear with the approach of spring again, thus exposing the lowermost rubber layer 8. Again, the grooves may be of such depth as to penetrate all layers, as shown, or penetrate only the outer layer and a part of the intermediate layer 9, or they may be a combination of both of these depths, as desired.

Figure 4:
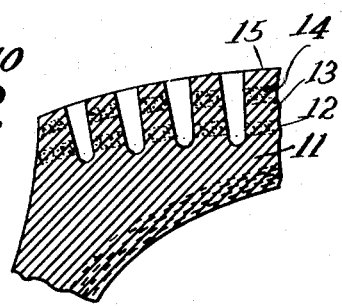
Fig. 4 is a fragmentary cross-sectional view of a third modification of the tire shown in Fig. 1.

Fig. 4 shows a still further modification wherein there is provided a base layer 11 of rubber, a layer 12 of anti-skid compound covered by a layer 13 of rubber, which in turn is covered by a layer 14 of anti-skid compound, and the last mentioned layer is covered by a final or outermost layer 15 of rubber. Layer 15 may be omitted, if desired. Such series of alternate layers of rubber and anti-skid composition is ideally suited for tires lasting several years, and the thicknesses should be predetermined from the ordinary wear expected from winter driving, as distinguished from spring, summer and fall driving, and may be somewhat of the magnitudes described in connection with Fig. 1. The grooves may extend throughout the thickness of all layers, as shown, or may penetrate any lesser depth, or there may be grooves, not only in the modification shown in Fig. 4, but in other modifications, of various depths so that some grooves penetrate the lowermost layers while others penetrate only certain outer layers, as desired.

Thus it will be seen that I have provided an efficient vehicle tire having multilayers of rubber and anti-skid material in order to provide an anti-skid outer surface for winter driving and to provide a rubber surface which wears longer than the anti-skid surface for other than winter driving, the various thicknesses of the respective layers being predetermined so that the anti-skid surface will completely wear with the coming of spring so as to expose the rubber underlayer. By the provisions of multilayers of different composition, the life of the tire may be prolonged to a much greater extent than possible with the provision of a complete outer layer of anti-skid material. It will be further seen that I have provided an anti-skid composition having particles of such nature, size and composition as to provide maximum anti-skid qualities and useful either as camelback for retreading old tires or for making new tires, or for making other articles such as shoe soles, carpets, gaskets, liners, etc.

While I have illustrated and described a certain specific embodiment of my invention, it will be apparent that this is by way of illustration only, and that various changes and modifications may be made within the contemplation of my invention and within the scope of the following claim.

I claim:

A year-around anti-skid vehicle tire, comprising a carcass having a covering base layer of rubber and an outer layer of anti-skid material, both of said layers being of substantial thickness so that each may provide a tread surface, said anti-skid material comprising a rubber matrix having embedded therein dispersed particles of irregularly shaped chunks of hard, fibrous anti-skid material having sharp projecting corners and edges so as to remain firmly anchored in the rubber, circumferential grooves extending through the entire thickness of said outer anti-skid layer and through a major portion of the thickness of said base layer, there being a large number of said grooves substantially uniformly distributed throughout the entire width of said outer and base layers, so that upon complete wear of said outer layer the base layer will be sufficiently grooved so as to provide anti-skid characteristics.

References Cited in the file of this patent

UNITED STATES PATENTS

| Number | Name | Date |
|---|---|---|
| Re. 23,135 | Gapen | July 19, 1949 |
| 1,088,845 | Stromeyer | Mar. 3, 1914 |
| 2,201,113 | Neal | May 14, 1940 |
| 2,272,637 | Glynn | Feb. 10, 1942 |
| 2,274,855 | Wallace | Mar. 3, 1942 |
| 2,422,652 | Bacon | June 24, 1947 |

FOREIGN PATENTS

| Number | Country | Date |
|---|---|---|
| 764,663 | France | May 25, 1934 |
| 850,821 | France | Dec. 27, 1939 |
| 863,504 | France | Apr. 3, 1941 |